(12) United States Patent
Zhao et al.

(10) Patent No.: US 11,169,614 B2
(45) Date of Patent: Nov. 9, 2021

(54) GESTURE DETECTION METHOD, GESTURE PROCESSING DEVICE, AND COMPUTER READABLE STORAGE MEDIUM

(71) Applicant: BOE TECHNOLOGY GROUP CO., LTD., Beijing (CN)

(72) Inventors: Jibo Zhao, Beijing (CN); Lei Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 130 days.

(21) Appl. No.: 16/492,104

(22) PCT Filed: Oct. 19, 2018

(86) PCT No.: PCT/CN2018/111080
§ 371 (c)(1),
(2) Date: Sep. 6, 2019

(87) PCT Pub. No.: WO2019/080780
PCT Pub. Date: May 2, 2019

(65) Prior Publication Data
US 2020/0387230 A1 Dec. 10, 2020

(30) Foreign Application Priority Data

Oct. 24, 2017 (CN) .......................... 201711000019.6

(51) Int. Cl.
*G06F 3/01* (2006.01)
*G06T 7/136* (2017.01)
(Continued)

(52) U.S. Cl.
CPC .............. *G06F 3/017* (2013.01); *G06F 3/011* (2013.01); *G06K 9/00335* (2013.01);
(Continued)

(58) Field of Classification Search
CPC .......... G06K 9/00335; G06K 9/00355; G06K 9/00375; G06K 9/00389; G06T 7/20;
(Continued)

(56) References Cited

U.S. PATENT DOCUMENTS 6,993,158 B2    1/2006  Cho et al.
10,318,800 B2*  6/2019  Zhang ................ G06K 9/00335
                                                      382/103
(Continued)

FOREIGN PATENT DOCUMENTS

CN      1402551 A     3/2003
CN    101437124 A     5/2009
(Continued)

OTHER PUBLICATIONS

Office action issued in Chinese Application No. 201711000019.6, dated Apr. 27, 2020, 24 pages.
(Continued)

*Primary Examiner* — Casey L Kretzer
(74) *Attorney, Agent, or Firm* — Dave Law Group LLC; Raj S. Dave

(57) ABSTRACT

A gesture detection method, a gesture processing device, and a computer readable storage medium. The gesture detection method includes: performing a shrinking process and a background modeling on a first frame of original image, to generate a first frame of background image; determining a motion region of the first frame of background image based on the first frame of background image; determining a first gesture detection area in the first frame of original image according to the motion region of the first frame of background image; and performing a gesture detection within the first gesture detection area.

12 Claims, 5 Drawing Sheets

(51) Int. Cl.
*G06T 7/13* (2017.01)
*G06T 7/174* (2017.01)
*G06T 7/246* (2017.01)
*G06K 9/00* (2006.01)

(52) U.S. Cl.
CPC ............ *G06K 9/00355* (2013.01); *G06T 7/13* (2017.01); *G06T 7/136* (2017.01); *G06T 7/174* (2017.01); *G06T 7/248* (2017.01)

(58) Field of Classification Search
CPC ... G06T 7/215; G06T 7/254; G06T 7/10–136; G06T 7/174; G06T 7/194; G06T 7/13; G06T 7/248; G06F 3/017; G06F 3/011
See application file for complete search history.

(56) References Cited

U.S. PATENT DOCUMENTS

| 2011/0111798 A1* | 5/2011 | Jeon | ............... G06F 3/017 455/556.1 |
| 2012/0027252 A1* | 2/2012 | Liu | ............... G06K 9/00355 382/103 |

FOREIGN PATENT DOCUMENTS

| CN | 102074000 A | 5/2011 | |
| CN | 101763515 B | 3/2012 | |
| CN | 102831439 A | 12/2012 | |
| CN | 103530613 A | 1/2014 | |
| CN | 103985136 A | 8/2014 | |
| CN | 105739702 A | 7/2016 | |
| CN | 106204649 A | 12/2016 | |
| CN | 106371614 A | 2/2017 | |
| CN | 106934333 A | 7/2017 | |
| EP | 3203412 A1 | 8/2017 | |
| JP | H10-1494447 A | 6/1998 | |
| WO | 2013/184333 A1 | 12/2013 | |
| WO | WO2017000764 A1 * | 1/2017 | ............... G06F 3/01 |

OTHER PUBLICATIONS

Extend European Search Report dated Jul. 8, 2021 for European patent application No. EP18870443.1.

* cited by examiner

GESTURE DETECTION METHOD, GESTURE PROCESSING DEVICE, AND COMPUTER READABLE STORAGE MEDIUM

CROSS-REFERENCE

The present application is the U.S. national stage of International Patent Application No. PCT/CN2018/111080, Oct. 19, 2018, which claims the benefit of priority to Chinese patent application No. 201711000019.6, filed on Oct. 24, 2017, the entire disclosures of which are incorporated herein by reference as part of the present application.

TECHNICAL FIELD

Embodiments of the present disclosure relate to a gesture detection method, a gesture processing device and a computer-readable storage medium.

BACKGROUND

Nowadays, there are more and more man-machine interactive ways. With a development of virtual technology, a man-machine interactive way based on gestures is attracting more and more attention, and has enormous advantages in hardware cost and operation mode. A gesture recognition function can be integrated in electronic equipment such as a television and a digital photo frame, to realize man-machine interaction based on gestures. The electronic equipment captures a motion of a user's hand through a camera, and detects and tracks hand features in the captured image to convert motion information of the hand into motion information of a cursor in the electronic equipment, so as to trigger corresponding operation commands such as controlling video play, switching web pages and interacting in a game. A gesture recognition technology based on a camera equipped by the electronic equipment and a corresponding recognition software can realize man-machine interaction based on gestures.

SUMMARY

At least an embodiment of the present disclosure provides a gesture detection method, comprising: performing a shrinking process and a background modeling on a first frame of original image, to generate a first frame of background image, determining a motion region of the first frame of background image based on the first frame of background image, determining a first gesture detection region in the first frame of original image according to the motion region of the first frame of background image, and performing a gesture detection within the first gesture detection region.

For example, the gesture detection method provided by at least one embodiment of the present disclosure further comprises: in a case where a first gesture is determined to exist within the first gesture detection region after performing the gesture detection within the first gesture detection region, determining a first gesture range of the first gesture in the first frame of original image, and determining a second gesture detection region of a second frame of original image according to the first gesture range of the first frame of original image.

For example, in the gesture detection method provided by at least one embodiment of the present disclosure, the determining the second gesture detection region of the second frame of original image according to the first gesture range of the first frame of original image comprises: determining a center coordinate of the second gesture detection region of the second frame of original image according to a center coordinate of the first gesture range, and determining a size of the second gesture detection region of the second frame of original image according to a size of the first gesture range, wherein the size of the second gesture detection region of the second frame of original image is $W_1 \times H_1$, $H_1$ is X1 times of a maximum side length of the first gesture range, $W_1$ is Y1 times of the maximum side length of the first gesture range, and X1 and Y1 are both integers greater than zero.

For example, the gesture detection method provided by at least one embodiment of the present disclosure further comprises: determining whether the size of the second gesture detection region of the second frame of original image is greater than a size of a preset detection region, under a condition that the size of the second gesture detection region of the second frame of original image is greater than the size of the preset detection region, performing a shrinking process on the second gesture detection region of the second frame of original image, to enable the size of the second gesture detection region of the second frame of original image to be identical to the size of the preset detection region; under a condition that the size of the second gesture detection region of the second frame of original image is not greater than the size of the preset detection region, keeping the size of the second gesture detection region of the second frame of original image unchanged.

For example, in the gesture detection method provided by at least one embodiment of the present disclosure, a size of the first gesture detection region of the first frame of original image is greater than the size of the preset detection region.

For example, the gesture detection method provided by at least one embodiment of the present disclosure further comprises: performing a gesture detection within the second gesture detection region.

For example, the gesture detection method provided by at least one embodiment of the present disclosure further comprises: in a case where a second gesture is determined to exist within the second gesture detection region after performing the gesture detection within the second gesture detection region, determining a second gesture range of the second gesture in the second frame of original image, and determining a third gesture detection region of a third frame of original image according to the second gesture range.

For example, in the gesture detection method provided by at least one embodiment of the present disclosure, the determining the third gesture detection region of the third frame of original image according to the second gesture range comprises: determining a center coordinate of the third gesture detection region of the third frame of original image according to the center coordinate of the second gesture range, and determining a size of the third gesture detection region of the third frame of original image according to a size of the second gesture range, wherein the size of the third gesture detection region of the third frame of original image is $W_2 \times H_2$, $H_2$ is X2 times of a maximum side length of the second gesture range, $W_2$ is Y2 times of the maximum side length of the second gesture range, and X2 and Y2 are both integers greater than zero.

For example, the gesture detection method provided by at least one embodiment of the present disclosure further comprises: in a case where a second gesture is determined not to exist within the second gesture detection region after performing the gesture detection within the second gesture detection region, performing a shrinking process and a background modeling on a third frame of original image, to generate a third frame of background image, determining a motion region of the third frame of background image based on the third frame of background image, determining a third gesture detection region in the third frame of original image according to the motion region of the third frame of background image, and performing a gesture detection within the third gesture detection region.

For example, in the gesture detection method provided by at least one embodiment of the present disclosure, the determining the motion region of the first frame of background image based on the first frame of background image comprises: determining an outline region of a moving object based on the first frame of background image; determining whether the outline region is greater than a threshold value of the motion region, if the outline region is greater than the threshold value of the motion region, determining the outline region to be the motion region of the first frame of background image.

For example, the gesture detection method provided by at least one embodiment of the present disclosure further comprises: in a case where a first gesture is determined not to exist within the first gesture detection region after performing the gesture detection within the first gesture detection region, performing a shrinking process and a background modeling on a second frame of original image, to generate a second frame of background image, determining a motion region of the second frame of background image based on the second frame of background image, determining a second gesture detection region in the second frame of original image according to the motion region of the second frame of background image, and performing a gesture detection within the second gesture detection region.

For example, in the gesture detection method provided by at least one embodiment of the present disclosure, the performing the shrinking process and the background modeling on the first frame of original image, to generate the first frame of background image comprises: performing the shrinking process on the first frame of original image and a first frame of original background image, to obtain a first frame of shrunken original image and a first frame of shrunken original background image, performing the background modeling on the first frame of shrunken original image based on the first frame of shrunken original background image, to obtain the first frame of background image, and the first frame of background image comprises a motion detection region and a background region, the motion detection region denotes a different region between the first frame of original image and the first frame of original background image, the motion detection region comprises the motion region, and the background region denotes an identical region between the first frame of original image and the first frame of original background image.

At least one embodiment of the present disclosure provides a gesture processing device, comprising a processor and a memory. The memory is configured to store a computer instruction, and following operations are realized when the computer instruction is executed by the processor: performing a shrinking process and a background modeling on a first frame of original image, to generate a first frame of background image, determining a motion region of the first frame of background image based on the first frame of background image, determining a first gesture detection region in the first frame of original image according to the motion region of the first frame of background image, and performing a gesture detection within the first gesture detection region.

For example, in the gesture processing device provided by at least one embodiment of the present disclosure, following operations are further realized when the computer instruction is executed by the processor: in a case where a first gesture is determined to exist within the first gesture detection region after performing the gesture detection within the first gesture detection region, determining a first gesture range of the first gesture in the first frame of original image, and determining a second gesture detection region of a second frame of original image according to the first gesture range of the first frame of original image.

For example, in the gesture processing device provided by at least one embodiment of the present disclosure, following operations are further realized when the computer instruction is executed by the processor: determining a center coordinate of the second gesture detection region of the second frame of original image according to a center coordinate of the first gesture range, and determining a size of the second gesture detection region of the second frame of original image according to a size of the first gesture range, wherein the size of the second gesture detection region of the second frame of original image is $W_1 \times H_1$, $H_1$ is X1 times of a maximum side length of the first gesture range, $W_1$ is Y1 times of the maximum side length of the first gesture range, and X1 and Y1 are both integers greater than zero.

For example, in the gesture processing device provided by at least one embodiment of the present disclosure, following operations are further realized when the computer instruction is executed by the processor: determining whether the size of the second gesture detection region of the second frame of original image is greater than a size of a preset detection region, under a condition that the size of the second gesture detection region of the second frame of original image is greater than the size of the preset detection region, performing a shrinking process on the second gesture detection region of the second frame of original image, to enable the size of the second gesture detection region of the second frame of original image to be identical to the size of the preset detection region; under a condition that the size of the second gesture detection region of the second frame of original image is not greater than the size of the preset detection region, keeping the size of the second gesture detection region of the second frame of original image unchanged.

For example, in the gesture processing device provided by at least one embodiment of the present disclosure, a size of the first gesture detection region of the first frame of original image is greater than the size of the preset detection region.

For example, in the gesture processing device provided by at least one embodiment of the present disclosure, following operations are further realized when the computer instruction is executed by the processor: performing a gesture detection within the second gesture detection region.

For example, in the gesture processing device provided by at least one embodiment of the present disclosure, following operations are further realized when the computer instruction is executed by the processor: in a case where a second gesture is determined to exist within the second gesture detection region after performing the gesture detection within the second gesture detection region, determining a second gesture range of the second gesture in the second frame of original image, and determining a third gesture detection region of a third frame of original image according to the second gesture range.

For example, in the gesture processing device provided by at least one embodiment of the present disclosure, following operations are further realized when the computer instruction is executed by the processor: determining a center coordinate of the third gesture detection region of the third frame of original image according to a center coordinate of the second gesture range, and determining a size of the third gesture detection region of the third frame of original image according to a size of the second gesture range, and the size of the third gesture detection region of the third frame of original image is $W_2 \times H_2$, $H_2$ is X2 times of a maximum side length of the second gesture range, $W_2$ is Y2 times of the maximum side length of the second gesture range, and X2 and Y2 are both integers greater than zero.

For example, in the gesture processing device provided by at least one embodiment of the present disclosure, following operations are further realized when the computer instruction is executed by the processor: in a case where a second gesture is determined not to exist within the second gesture detection region after performing the gesture detection within the second gesture detection region, performing a shrinking process and a background modeling on a third frame of original image, to generate a third frame of background image, determining a motion region of the third frame of background image based on the third frame of background image, determining a third gesture detection region in the third frame of original image according to the motion region of the third frame of background image, and performing a gesture detection within the third gesture detection region.

For example, in the gesture processing device provided by at least one embodiment of the present disclosure, when the computer instruction is executed by the processor to realize determining the motion region of the first frame of background image based on the first frame of background image, following operations are further realized: determining an outline region of a moving object based on the first frame of background image; determining whether the outline region is greater than a threshold value of the motion region, if the outline region is greater than the threshold value of the motion region, determining the outline region to be the motion region of the first frame of background image.

For example, in the gesture processing device provided by at least one embodiment of the present disclosure, following operations are further realized when the computer instruction is executed by the processor: in a case where a first gesture is determined not to exist within the first gesture detection region after performing the gesture detection within the first gesture detection region, performing a shrinking process and a background modeling on a second frame of original image, to generate a second frame of background image, determining a motion region of the second frame of background image based on the second frame of background image, determining a second gesture detection region in the second frame of original image according to the motion region of the second frame of background image, and performing a gesture detection within the second gesture detection region.

For example, in the gesture processing device provided by at least one embodiment of the present disclosure, when the computer instruction is executed by the processor to realize performing the shrinking process and the background modeling on the first frame of original image, to generate the first frame of background image, following operations are further realized: performing the shrinking process on the first frame of original image and a first frame of original background image, to obtain a first frame of shrunken original image and a first frame of shrunken original background image, performing the background modeling on the first frame of shrunken original image based on the first frame of shrunken original background image, to obtain the first frame of background image, wherein the first frame of background image comprises a motion detection region and a background region, the motion detection region denotes a different region between the first frame of original image and the first frame of original background image, the motion detection region comprises the motion region, and the background region denotes an identical region between the first frame of original image and the first frame of original background image.

At least one embodiment of the present disclosure provides a computer-readable medium, configured to store a non-transient computer-readable instruction. In a case where the non-transient computer-readable instruction is executed by a computer, the gesture detection method according to any one of the above gesture detection method is executed.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
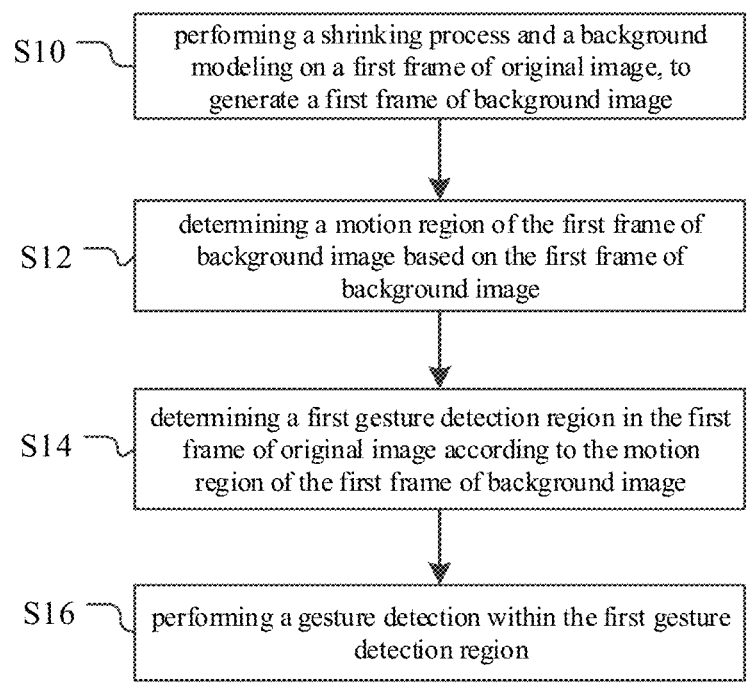
FIG. 1 is a schematic flow chart of a gesture detection method provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

To keep following descriptions about the embodiments of the present disclosure clear and concise, detailed descriptions about the known functions and components are omitted.

Human-Computer Interaction (HCI) or Human-Machine Interaction mainly studies interactive manners between human and a computer (or other machines) which may comprise a variety of interactive manners. People may use a mouse, a keyboard, a touch screen and the like to interact with a computer (or other machines), and voice, gesture, expression and the like may be further used for interacting. Gesture interaction is an interaction manner using technologies such as computer graphics to recognize body language of a user, and to convert into a command for operating an equipment. The gesture recognition recognizes a user's gesture mainly through mathematical algorithms, so as to allow the user to interact with a computer (or other machines) by gestures.

The gesture recognition may be categorized as gesture recognition based on data glove and gesture recognition based on machine vision according to whether auxiliary equipment is needed to wear. The gesture recognition based on data glove needs to wear data glove and has a quick recognition speed and a relatively high accuracy rate, but the data glove is of high cost. The gesture recognition based on machine vision directly recognizes through the user's hand and can realize human-machine interaction intuitively and conveniently. For example, the gesture recognition may be categorized as static gesture recognition and dynamic gesture recognition according to a way of expressing gestures. The static gesture recognition is used to recognize a single posture of the user's hand, such as stretch and bend of a finger, open and close of a palm. The dynamic gesture recognition is used to recognize motion track and motion law of the user's hand.

An electronic equipment with gesture recognition usually uses a conventional web camera to obtain a real time gesture image, and meanwhile uses gesture detection algorithms with strong robustness to detect gestures, so that the gesture recognition can be achieved, which needs full-screen detection, has a slow recognition speed and is difficult to run smoothly in a terminal equipment.

At least one embodiment of the present disclosure provides a gesture detection method, a gesture processing device and a computer-readable storage medium, which can reduce a scanning range of a gesture detector, reduce an amount of computation, improve a computation speed, and ensure a smooth operation of an electronic equipment on a premise that the gesture recognition function is not influenced, by motion detection.

It should be noted that in the present disclosure, "gesture" may comprise all kinds of postures of a hand, all kinds of postures of a handheld object, all kinds of postures of a target and the like. For example, the postures of a hand may comprise a fist, a stretch of a palm, a scissor hand, a stretch of an index finger and the like. The target may be a person, and the postures of the target may comprise the person in a standing position, a crouching position and the like. The target may be also an object such as a box, and the postures of the target may comprise the box in an open state, a close state and the like. In a case where the target has different shapes, the postures of the target may comprise the different shapes of the target. The handheld object may be a pen, a mouse, a remote control and the like. In a case where the handheld object has different shapes, the postures of a handheld object may indicate the different shapes of the handheld object. In the below descriptions of the present disclosure, the embodiments of the present disclosure are described taking the postures of a hand as a gesture for example, which is included but not limited by the present disclosure.

Embodiments of the present disclosure are described in detail in combination with the drawings; however, the present disclosure is not limited to the detailed embodiments.

FIG. 1 is a schematic flow chart of a gesture detection method provided by an embodiment of the present disclosure.

For example, as illustrated in FIG. 1, the gesture detection method provided by the embodiment of the present disclosure comprises following operations.

Operation S10: performing a shrinking process and a background modeling on a first frame of original image, to generate a first frame of background image;

Operation S12: determining a motion region of the first frame of background image based on the first frame of background image;

Operation S14: determining a first gesture detection region in the first frame of original image according to the motion region of the first frame of background image; and Operation S16: performing a gesture detection within the first gesture detection region.

For example, during the operation S10, an interpolation algorithm may be used to perform the shrinking process on the first frame of original image, to reduce a size of the first frame of original image. The interpolation algorithm exemplarily comprises Lagrange interpolation, Nearest interpolation, Gauss interpolation, Bilinear interpolation, Quadratic interpolation, Cubic interpolation, Newton interpolation and the like.

For example, during the operation S10, the background modeling may adopt an inter-frame difference method, a background difference method, Gauss modeling method, approximate median filtering, Kalamn filtering, a modeling method based on color information, a kernel density estimation method and the like. A principle of the inter-frame difference method is to extract a motion region in an image using pixel-based time difference between adjacent two frames of image or among adjacent three frames of image in an image sequence. The Gauss modeling is a background representation method based on statistical information of a pixel sample, which uses statistical information (e.g. the number of modes, mean value and standard deviation of each mode) such as a probability density of a large number of sample values of a pixel within a long time period, to represent the background, and then uses statistical difference (e.g. 3σ principle) to determine a target pixel, thereby performing a modeling on a complicated dynamic background. The Gauss modeling method may exemplarily comprise the single Gaussian model, the Gaussian mixture model and the like.

For example, the operation S10 may comprise: performing the shrinking process on the first frame of original image and a first frame of original background image, to obtain a first frame of shrunken original image and a first frame of shrunken original background image, and performing the background modeling on the first frame of shrunken original image based on the first frame of shrunken original background image, to obtain the first frame of background image.

For example, the first frame of background image comprises a motion detection region and a background region, the motion detection region denotes a different region between the first frame of original image and the first frame of original background image, and comprises the motion region, and the background region denotes an identical region between the first frame of original image and the first frame of original background image.

For example, the motion detection region denotes all regions where a motion possibly exists, and the motion detection region may denote a collection of plural discrete regions.

For example, the first frame of original background image may denote a background image and the background image denotes an image which is captured by an image capture device in case of no gesture; or, the first frame of original background image may further denote an original image before the first frame of original image or an original image after the first frame of background image. In a case where the first frame of original background image denotes an original image before the first frame of original image and no original image is before the first frame of original image, the first frame of original background image may be a background image; on another hand, in a case where the first frame of original background image denotes an original image after the first frame of original image and no original image is after the first frame of original image, the first frame of original background image may also be a background image. For example, in a case of performing a background modeling on a K-th frame of original image, a K-th frame of original background image corresponding to the K-th frame of original image may be the background image; or, the K-th fame of original background image may be a (K−K0)-th frame of original image or a (K+K1)-th frame of original image, wherein K is an integer greater than 1; K0 is an integer equal to or greater than 1 and K0 may be exemplarily 1 or 2; K1 is an integer equal to or greater than 1, and K1 may be also 1 or 2 for example.

For example, the number of the first frame of original background image may be more than one. In a case of performing a background modeling on the K-th frame of original image, the K-th fame of original background image corresponding to the K-th frame of original image may comprise the (K−K0)-th frame of original image and the (K+K1)-th frame of original image.

For example, a size of the first frame of original background image may be identical to a size of the first frame of original image.

For example, during the operation S10, a background modeling may be firstly performed on the first frame of original image based on the first frame of original background image to obtain a first frame of intermediate background image, and then a shrinking process is performed on the first frame of intermediate background image to obtain the first frame of background image; that is to say, a sequence of the background modeling and the shrinking process is not limited during the operation S10.

It should be noted that during the process of the background modeling, motion detection of the moving object is also realized.

For example, in a case where the electronic equipment adopts the Android operation system, according to a computing power of the Android operation system, a type of the background modeling and an upgrade speed may be adjusted to adapt to the Android operation system. For example, the computer can process 30 frames of images per second, but the Android operation system can process only 10 frames of images per second; that is, compared to the computer, a difference between adjacent frames of images in the electronic equipment is relatively great, so more sensitive parameters need to be set in the electronic equipment to allow user experience about gesture operations in the electronic equipment to be close to that in the computer.

For example, in a case where the gesture changes too fast and a difference between adjacent frames of original images is too great, during the background modeling, more sensitive background modeling parameters may be set to reduce an error between the background image and the original image and improve an accuracy rate of the gesture detection. For example, for the inter-frame difference method, if the object moves fast, a relatively small time interval may be chosen; if the object moves slowly, a relatively large time interval may be chosen.

Figure 2A:
FIG. 2A is a schematic view of a first frame of original image provided by an embodiment of the present disclosure.
Figure 2B:
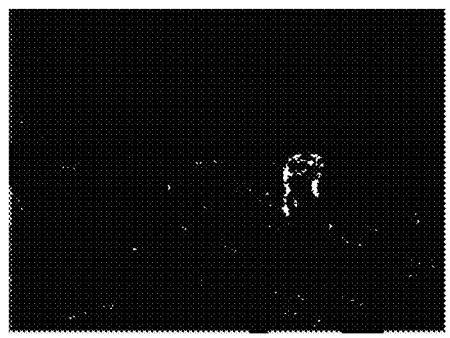
FIG. 2B is a schematic view of a first frame of background image of the first frame of original image as illustrated in FIG. 2A.

FIG. 2A is a schematic view of a first frame of original image provided by an embodiment of the present disclosure, and FIG. 2B is a schematic view of a first frame of background image provided by an embodiment of the present disclosure.

For example, the first frame of background image as illustrated in FIG. 2B is obtained by performing a shrinking process and a background modeling on the first frame of original image as illustrated in FIG. 2A. As illustrated in FIG. 2B, in the first frame of background image, a white portion denotes a region where a motion occurs, and the black region denotes a region where no motion occurs.

For example, in some examples, if the gesture is a fist, the gesture recognition requires that a minimum resolution of a region occupied by the gesture be 40×40 (e.g. measured in pixels). If an operation distance of the gesture recognition is 2 meters, a resolution of each frame of original image needs to be about 1280×960, so as to allow the minimum resolution of the region occupied by the gesture to be about 40×40. It should be noted that the operation distance denotes a distance between the user's hand and an image capture terminal (e. g. a camera) of the electronic equipment. For example, a range of the operation distance is 0.5 to 2 meters.

It should be noted that in the embodiments of the present disclosure, the resolution and the size of an image both may be measured in pixels. For example, a resolution of an original image is 1280×960, which denotes that the original image comprises a pixel matrix with 1280 pixel rows and 960 pixel columns.

For example, the electronic equipment may be a terminal device. The terminal device may exemplarily comprise a smartphone, a tablet computer, a personal computer, a game device and the like. The image capture terminal may be a camera of a smartphone, a camera of a tablet computer, a camera of a personal computer and the like. The image capture terminal may further be a lens of a digital camera, a web camera and the like. In some embodiments, the terminal device and the image capture terminal may be different devices and separated from each other. In some other embodiments, the image capture terminal may be included in the terminal device. For example, the image capture terminal may be a camera embedded in or mounted to the terminal device.

It should be noted that the electronic equipment may also be a liquid crystal television and the like. A type of the electronic equipment is not limited by the embodiments of the present disclosure.

For example, in an example, a resolution of the first frame of original image may be 1280×960, and a resolution of the first frame of background image may be 320×240.

For example, the first frame of original image may be a color image, or a grayscale image.

It should be noted that before performing the background modeling on the first frame of original image, the gesture detection method may further comprise performing a pre-processing on the first frame of original image. The preprocessing can eliminate irrelevant information or noise information of the first frame of original image. The preprocessing may exemplarily comprise performing a process such as a Gamma correction, a skin color extraction, a dilation process, a grayscale transformation, a color space transformation, an image enhancement, or a noise reduction and filtering on the first frame of original image. For example, the filtering process of the first frame of original image may comprise a spatial domain method and a frequency domain method. The spatial domain method mainly comprises a smoothing and filtering process, and the frequency domain method mainly comprises all kinds of frequency domain transformation operations such as Fourier transformation.

For example, the operation S12 may comprise: determining an outline region of a moving object based on the first frame of background image; determining whether the outline region is greater than a threshold value of the motion region, in a case where the outline region is determined to be greater than or equal to the threshold value of the motion region, determining the outline region to be the motion region of the first frame of background image; in a case where the outline region is determined to be smaller than the threshold value of the motion region, determining the outline region to be a noise region and performing no process on the first frame of background image for example.

For example, during the detection process, movements of the object in the first frame of background image can be detected. Therefore, after detection of the moving object in the first frame of background image, plural outline regions of the moving object can be obtained. If the outline region of the moving object is small, the outline region is determined to be a noise region and needs to be removed. For example, the motion detection region comprises all outline regions of all moving objects.

For example, the threshold resolution of the motion region may be 100 pixels, that is, in a case where the resolution of the outline region of the moving object is less than 100 pixels, the outline region of the moving object is determined to be a noise region, which is however not limited. The threshold resolution of the motion region may also be other values which is not limited here.

For example, the operation S14 may comprise: determining a center coordinate of the motion region of the first frame of background image; mapping the center coordinate of the motion region of the first frame of background image to the first frame of original image to determine a center coordinate of a first gesture detection region in the first frame of original image; and extracting a region with a predetermined size in the first frame of original image as the first gesture detection region according to the center coordinate of the first gesture detection region. The predetermined size is described below.

Figure 3A:
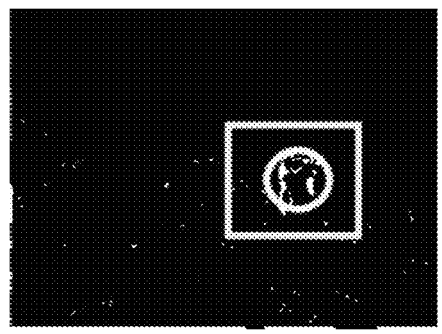
FIG. 3A is a schematic view of a motion region of the first frame of background image as illustrated in FIG. 2B.
Figure 3B:
FIG. 3B is a schematic view of a first gesture detection region in the first frame of original image as illustrated in FIG. 2A.
Figure 3C:
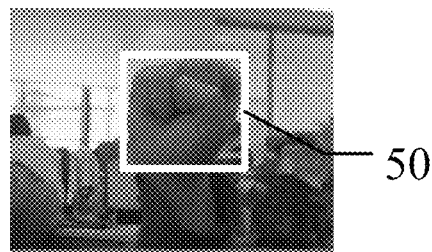
FIG. 3C is a schematic view of the first gesture detection region extracted from the first frame of original image as illustrated in FIG. 3B.

FIG. 3A is a schematic view of a motion region of the first frame of background image provided by an embodiment of the present disclosure; FIG. 3B is a schematic view of the first gesture detection region in the first frame of original image provided by an embodiment of the present disclosure; FIG. 3C is a schematic view of the first gesture detection region extracted from the first frame of original image as illustrated in FIG. 3B.

The first gesture detection region in FIG. 3B is obtained by mapping the motion region in the first frame of background image in FIG. 3A to the first frame of original image.

For example, as illustrated in FIG. 3A and FIG. 3B, in an example, the motion region of the first frame of background image may be a region with a white outline circled by a circular frame in FIG. 3A, and the circular frame may also be a circumcircle of the white outline. The center coordinate of the motion region of the first frame of background image may be exemplarily a circle center coordinate of the circular frame. The first gesture detection region may be a region circled by a rectangular frame in FIG. 3B. The first gesture detection region (i.e. the region circled by the rectangular frame in FIG. 3B) in the first frame of original image exemplarily corresponds to the region circled by the rectangular frame in the first frame of background image in FIG. 3A; that is, the region circled by the rectangular frame in FIG. 3A is obtained by mapping the first gesture detection region to the first frame of background image.

It should be noted that, in FIG. 3A and FIG. 3B, the first gesture detection region is in a rectangular shape, which is however is not limited. According to practical needs, the first gesture detection region may also be in a circular shape, an oval shape, a polygonal shape and the like.

For example, during the operation S14, the center coordinate of the motion region of the first frame of background image may be mapped to the first frame of original image according to a shrinking proportion during the operation S10. During the operation S10, if the shrinking process is performed on the first frame of original image in a proportion of F to generate the first frame of background image, and the center coordinate of the motion region of the first frame of background image is (X1, Y1), i.e. the circle center coordinate of the circular frame in FIG. 3A is (X1, Y1), which is mapped to the first frame of original image as a coordinate (X2, Y2), X2=X1*F, and Y2=Y1*F, i.e. the center coordinate of the first gesture detection region may be (X1*F, Y1*F). In an example, a resolution of the first frame of original image is 1280×960, and a resolution of the first frame of background image is 320×240, F=1280/320=960/240=4, X2=X1*4 (i.e. X1*1280/320), Y2=Y1*4 (i.e. Y1*960/240). It should be noted that in a case where shrinking proportions in a row direction and in a column direction are different, X2 and Y2 are respectively calculated according to corresponding shrinking proportions. For example, in an example, the resolution of the first frame of original image is 1280×960, the resolution of the first frame of background image is 320×320, and the proportion F comprises a first proportion F1 (the shrinking proportion in the row direction) and a second proportion F2 (the shrinking proportion in the column direction). Thus, F1=1280/320=4, F2=960/320=3, X2=X1*4 (i.e. X1*F1), Y2=Y1*3 (i.e. Y1*F2).

For example, during the operation S14, the predetermined size of the first gesture detection region may be 200×150. The predetermined size is associated with the resolution of the first frame of original image and the operation distance. The smaller the operation distance is, the greater the predetermined size is. The higher the resolution of the first frame of original image is, the greater the predetermined size is. The predetermined size may be set according to practical needs, as long as a region with the predetermined size is ensured to cover a first gesture range in the first frame of original image. For example, as illustrated in FIG. 3A, in the first frame of background image, the region circled by the circular frame denotes the motion region of the first frame of background image, that is, the region circled by the circular frame may correspond to the first gesture range in the first frame of original image, and the region circled by the rectangular frame may correspond to the region with the predetermined size in the first frame of original image (i.e. the first gesture detection region). The region circled by the rectangular frame covers the region circled by the circular frame; that is to say, the first gesture detection region in the first frame of original image covers the first gesture range in the first frame of original image. It should be noted that the first gesture range is described below.

For example, operation S16 may comprise scanning respectively the first gesture detection region by a gesture detector using a first group of scales within a first scale range, so as to realize the gesture detection. For example, the first scale range may be 40×40 to 150×150. The first group of scales may comprise multiple scales with different values. For example, the first group of scales may comprise 40×40, 60×60, 80×80, 120×120 and the like. The number and specific values of the first group of scales may be set according to practical cases, which is not limited by the present disclosure.

In the gesture detection method provided by the embodiments of the present disclosure, the gesture detector only needs to perform gesture detection within the first gesture detection region, a size of which is smaller than a size of the first frame of original image, and thus the amount of computation can be reduced and the speed of the gesture detection can be improved.

For example, the gesture detection mainly comprise gesture segmentation, gesture analysis and gesture recognition. The gesture segmentation is used to extract the first gesture range from the first gesture detection region. A method of the gesture segmentation may comprise a method based on motion detection, a method based on a motion model, a method base on color information and the like. The gesture analysis is used to acquire a shape feature or motion track of the gesture, and the method of the gesture analysis comprises an edge and contour extraction method, a mass center finger multiple-feature combination method, a knuckle tracking method and the like. The gesture recognition is to classify tracks (or dots) in a model parameter space to some subset in the space, and comprises static gesture recognition and dynamic gesture recognition. For example, the method of the gesture recognition may comprise a template matching method, a neural network method, a hidden Markov model method and the like.

For example, the gesture detector may adopt a method based on a template matching, a linear subspace method, a probability statistics-based method, a neural network method and the like to perform the gesture detection. For example, the linear subspace method comprises a Principal Component Analysis (PCA) method, a Linear Discriminate Analysis (LDA) method, a Factor Analysis (FA) method and the like. The probability statistics-based method comprises a Hidden Markov Models (HMM) method, a method based on Kullback information theory, a Support Vector Machine (SVM) method, a Bayes decision-making method, an AdaBoost method and the like. The neural network method may comprise a Radial Basis Function neural network, a convolutional neural network (CNN), a probability neural network (PNN) and the like.

For example, in an example, the gesture detector may comprise a neural network. The neural network may extract feature information of the first frame of original image within the first gesture detection region, and determines a type of the first gesture based on the extracted feature information. Before performing the gesture detection by using the gesture detector, the neural network of the gesture detector needs to be trained using a large number of sample gesture images. The sample gesture image may comprise different types of gesture images, to obtain parameters and feature models of the neural network corresponding to different types of gesture images. According to practical application requirements, the sample gesture images may comprise a gesture image of making a fist, a palm stretch gesture image, a scissor hand gesture image and the like. For example, the sample gesture images may comprise gesture images obtained by sampling people in different age groups and from different places, so as to improve an accuracy of gesture detection and recognition of the neural network.

Figure 4:
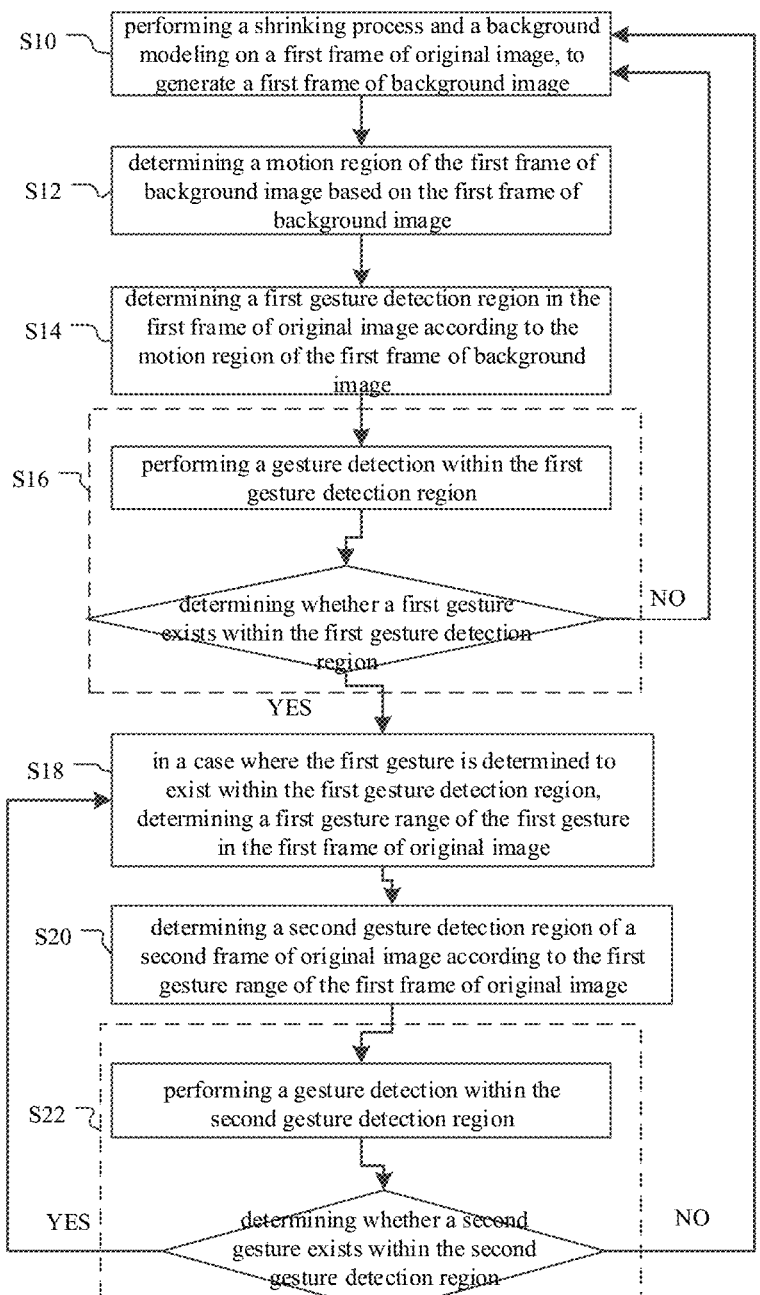
FIG. 4 is another schematic flow chart of a gesture detection method provided by an embodiment of the present disclosure.
Figure 5A:
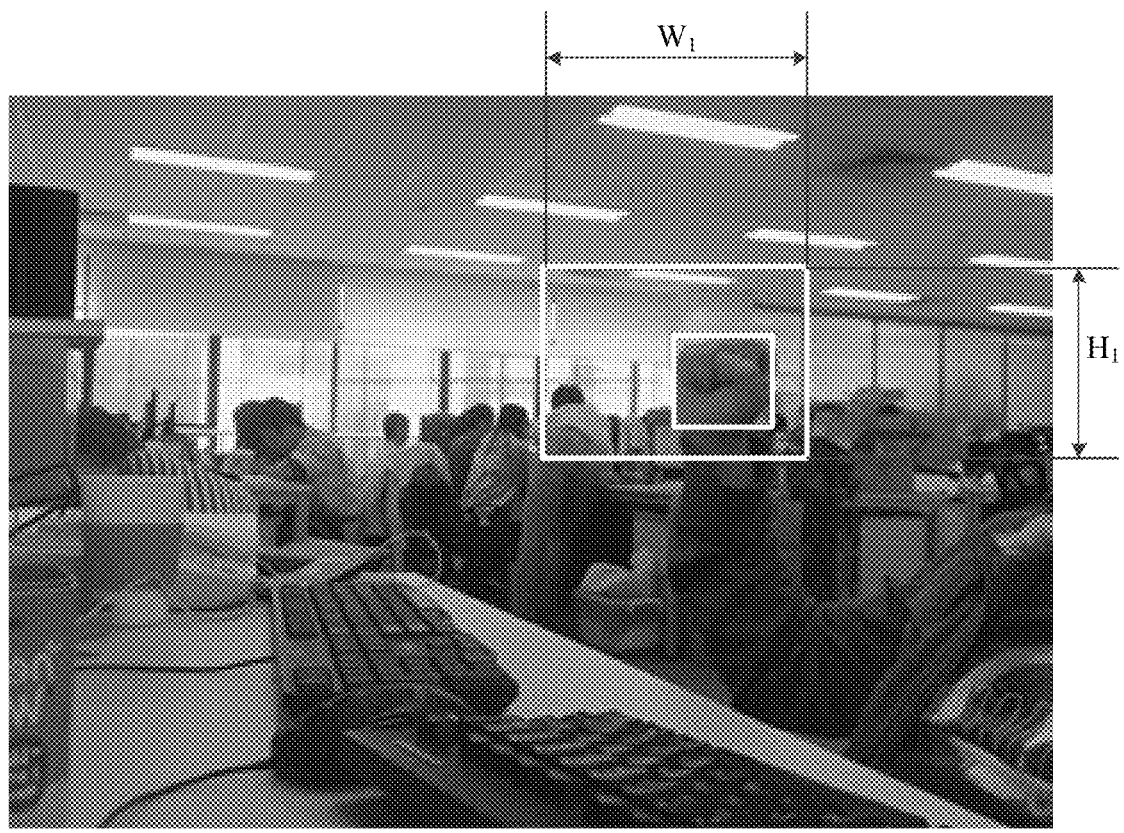
FIG. 5A and FIG. 5B are schematic views of a second gesture detection region in a second frame of original image provided by an embodiment of the present disclosure.
Figure 5B:
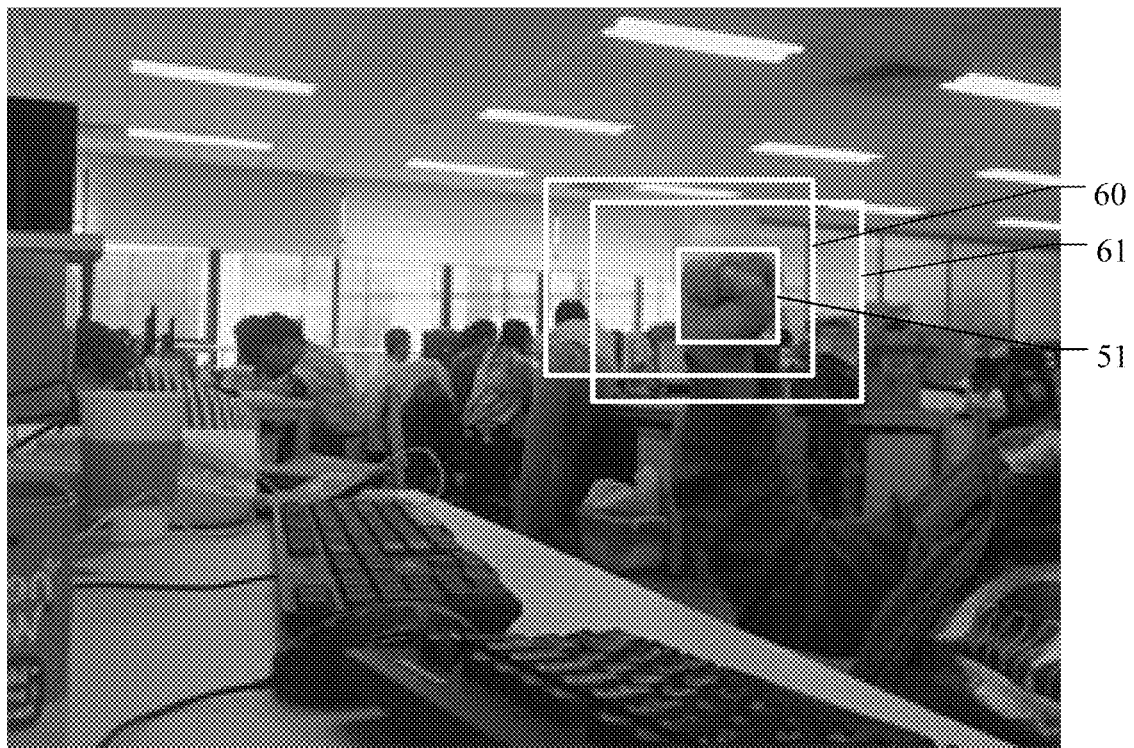
Figure 6:
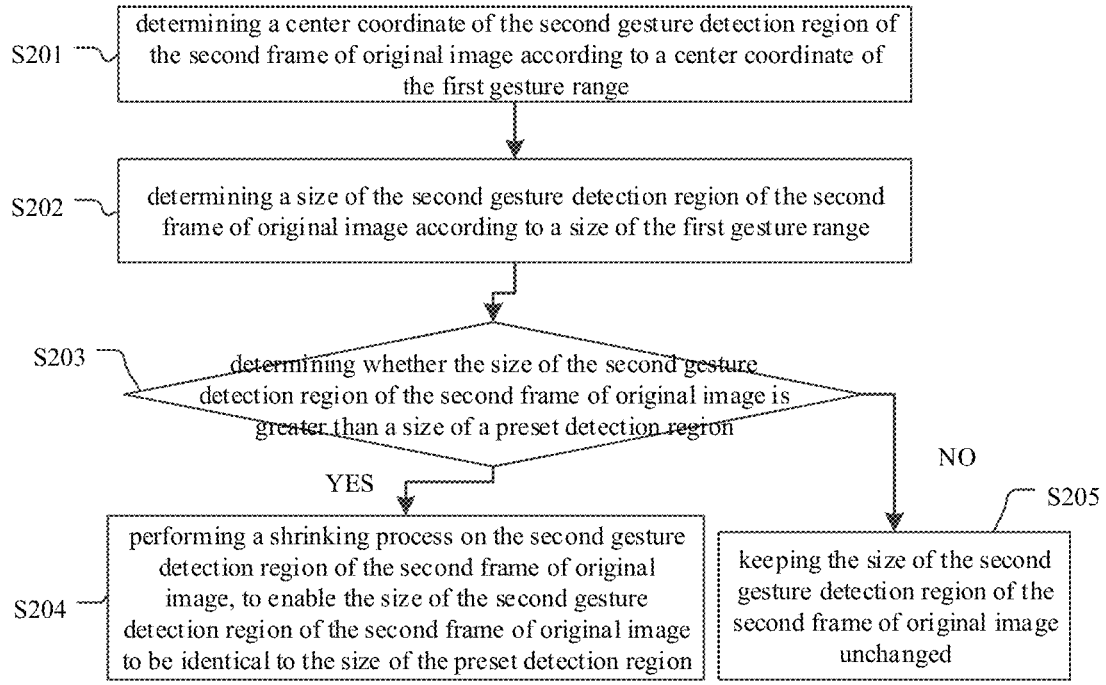
FIG. 6 is a schematic flow chart of an operation S20 in FIG. 4.

FIG. 4 is another schematic flow chart of a gesture detection method provided by an embodiment of the present disclosure; FIG. 5A and FIG. 5B are schematic views of a second gesture detection region in a second frame of original image provided by an embodiment of the present disclosure; FIG. 6 is a schematic flow chart of the operation S20 in FIG. 4.

For example, the gesture detection method provided by the embodiment of the present disclosure may comprise a motion detection period and a continuous gesture tracking detection period. As illustrated in FIG. 4, the motion detection period comprises operation S10 to operation S16, and the continuous gesture tracking period comprises operation S18 to operation S22.

It should be noted that the operation S10 to the operation S16 describe the motion detection period by taking the first frame of original image as an example, which is however not limited by the present disclosure. The motion detection period may be applied to each frame of original image such as the second frame of original image, the third frame of original image, etc. Correspondingly, the operation S18 to the operation S22 describe the continuous gesture tracking detection period by taking the second frame of original image as an example, which is however not limited by the present disclosure. The continuous gesture tracking detection period may be applied to each frame of original image such as the third frame of original image, the fourth frame of original image, etc., as long as the first frame of original image and the second frame of original image in the operation S18 to the operation S22 are replaced with two adjacent frames of original images (e. g. the third frame of original image and the fourth frame of original image).

For example, as illustrated in FIG. 4, the operation S16 may further comprise determining whether the first gesture exists within the first gesture detection region after performing the gesture detection within the first gesture detection region. In a case where the first gesture is determined not to exist within the first gesture detection region, the gesture detection method may further comprise: performing a shrinking process and a background modeling on a second frame of original image, to generate a second frame of background image, determining a motion region of the second frame of background image based on the second frame of background image, determining a second gesture detection region in the second frame of original image according to the motion region of the second frame of background image, and performing a gesture detection within the second gesture detection region. That is, in a case where the first gesture does not exist within the first gesture detection region, motion detection is performed on the second frame of original image.

For example, the first frame of original image and the second frame of original image are adjacent in time, which is however not limited to the present disclosure. The first frame of original image and the second frame of original image may not be adjacent in time.

It should be noted that detailed descriptions about performing the background modeling on the second frame of original image may refer to the above relevant descriptions about performing the background modeling on the first frame of original image, and the same contents are not repeated here.

In a case where no gesture is detected in each frame of original image, the electronic equipment needs to perform motion detection on only corresponding frames of background images (a resolution of which is 320×240 for example), so as to save computation time. During the motion detection process, if the electronic equipment detects motion information (e. g. non-subjective behaviors such as a user unconsciously shaking head, a passer-by passing the image capture terminal) but detects no gesture, the electronic equipment circularly performs the motion detection, that is, performs the motion detection once for each frame of background image.

For example, as illustrated in FIG. 4, in a case where the first gesture is determined to exist within the first gesture detection region after performing the gesture detection within the first gesture detection region, the continuous gesture tracking detection is performed from the second frame of original image, that is, during the motion detection process, if the electronic equipment detects gesture motion (for example, waving a hand, raising a hand, moving from a first posture to a second posture of an object, changing from a first shape to a second shape of an object, moving from a first posture to a second posture of a handheld object, changing from a first shape to a second shape of a handheld object, etc.), the electronic equipment may determine a gesture detection region of an adjacent next frame of original image according to a gesture range of a previous frame of original image, of two adjacent frames, and performing a gesture detection within the gesture detection region in each frame of original image, thereby realizing the continuous gesture tracking detection.

For example, as illustrated in FIG. 4, during the continuous gesture tracking detection process, the gesture detection method provided by the embodiments of the present disclosure comprises following operations:

Operation S18: in a case where the first gesture is determined to exist within the first gesture detection region, determining a first gesture range of the first gesture in the first frame of original image, and Operation S20: determining a second gesture detection region of a second frame of original image according to the first gesture range of the first frame of original image.

For example, as illustrated in FIG. 3C, a region 50 is the first gesture range of the first frame of original image, and the first gesture range 50 may be a bounding rectangle of the detected first gesture, which is however not limited to the present disclosure. According to practical demands, the first gesture range may be also a circle, an oval, a polygon and the like, as long as the first gesture range can cover the first gesture.

For example, the first gesture may be a fist, a stretch of a palm, a scissor hand, a stretch of an index finger and the like.

For example, the first gesture range is relevant to a type of the first gesture. Different types of first gestures have different first gesture ranges. For example, in a case where the first gesture is a fist, the first gesture range may be 40×40; in a case where the first gesture is a stretch of a palm, the first gesture range may be 40×60; in a case where the first gesture is a scissor hand, the first gesture range may be 30×60, which is however not limited to the present disclosure. The type of the first gesture and the first gesture range may be preset according to the user's practical demand. For example, in a case the first gesture is a fist, the first gesture range may also be preset as 50×50.

For example, the first gesture range is also relevant to the operation distance and the resolution of the first frame of original image. For example, the greater the operation distance is, the less the first gesture range is; the higher the resolution of the first frame of original image is, the resolution of the first gesture range is.

For example, the detailed descriptions of the second frame of original image may refer to the description about the first frame of original image, and the same contents are not repeated here.

For example, as illustrated in FIG. 6, the operation S20 may further comprise following operations:

Operation S201: determining a center coordinate of the second gesture detection region of the second frame of original image according to a center coordinate of the first gesture range, and Operation S202: determining a size of the second gesture detection region of the second frame of original image according to a size of the first gesture range.

For example, in the operation S201, the center coordinate of the second gesture detection region of the second frame of original image is the center coordinate of the first gesture range, so as to ensure that the first gesture range is fully covered by the second gesture detection region.

For example, in the operation S202, the size of the second gesture detection region of the second frame of original image may be expressed as $W_1 \times H_1$, $W_1$ is Y1 (e.g. 3) times of a maximum side length of the first gesture range, $H_1$ is X1 (e.g. 2) times of the maximum side length of the first gesture range, and X1 and Y1 are both integers greater than zero. For example, $H_1$ denotes a height of the second gesture detection region, and $W_1$ denotes a width of the second gesture detection region.

It should be noted that the above descriptions about X1 and Y1 are only illustrative instead of being limitative. According to practical situation, X1 and Y1 may also be other values; for example, X1 may be 3 and Y1 may be 4. The specific vales of X1 and Y1 are not limited by the embodiments of the present disclosure.

For example, as illustrated in FIG. 6, in an example, after executing the operation S202, the gesture detection method further comprises:

Operation S203: determining whether the size of the second gesture detection region of the second frame of original image is greater than a size of a preset detection region, under a condition that the size of the second gesture detection region of the second frame of original image is greater than the size of the preset detection region, executing operation S204, i.e. performing a shrinking process on the second gesture detection region of the second frame of original image, to enable the size of the second gesture detection region of the second frame of original image to be identical to the size of the preset detection region; under a condition that the size of the second gesture detection region of the second frame of original image is not greater than the size of the preset detection region, executing operation S205, i.e. keeping the size of the second gesture detection region of the second frame of original image unchanged.

The gesture detection method provided by the embodiments of the present disclosure can ensure scanning and detecting to be performed within a small range by the gesture detector, which can save computation time and realize continuous recognition of a moving gesture. The computation speed of the gesture detection method is not affected by a size of each frame of original image, so as to allow the original image to have a higher resolution, thus lengthening an effective distance of the gesture recognition.

For example, in the operation S202, in a case where a distance between the user's hand and the image capture terminal of the electronic equipment is small, the detected first gesture range is relatively large, causing the size of the second gesture detection region to be relatively great. During treating the second gesture detection region, the data computation amount may be beyond a computing power of an operation system (e.g. Android operation system) of the electronic equipment. Therefore, in a case the size of the second gesture detection region is greater than the size of the preset detection region, a shrinking process is performed on the second gesture detection region to allow the size of the second gesture detection region to be equal to the size of the preset detection region, then a gesture detector is used to perform gesture recognition and detection on the shrunken second gesture detection region, and after the second gesture is detected, a coordinate and a side length of the second gesture is mapped by expansion to a corresponding position in the second frame of original image.

It should be noted that in the above description, the second frame of original image is taken as an example to illustrate, which is however not limited to the present disclosure. For example, during the continuous gesture tracking detection period, the gesture detection region of each frame of original image may be treated with the operation S203. In this way, an upper limit of detection time of the gesture detection region of each frame of original image may be fixed, so as to avoid a stuttering phenomenon due to size nonuniformity of gesture detection regions of frames of original images, thereby further improving fluency of the electronic equipment.

For example, the size of the first gesture detection region of the first frame of original image may be greater than the size of the preset detection region. After performing the motion detection on the first frame of original image, a shaking range of a hand or other objects is detected out, and a center point of a hand or a size of a bounding rectangle of an outline of a hand cannot be positioned, i.e. the first gesture detection region is a to-be-detected region of a hand, so the detection region needs to be enlarged to ensure that a specific location and size of the hand is obtained, so as to provide a basis for an optimization of continuous gesture tracking detection.

For example, the size of the preset detection region may be expressed as P×Q, P is Y0 (e.g. 3) times of a maximum side length of a minimum region occupied by the gesture, Q is X0 (e.g. 2) times of the maximum side length of the minimum region occupied by the gesture, and X0 and Y0 are both integers greater than zero. For example, in an example, if the gesture is a fist, a size of the region occupied by the gesture may be 40×40, and the size of the preset detection region may be 120×80. In another example, if the gesture is a scissor hand, a size of the region occupied by the gesture may be 30×60, and the size of the preset detection region may be 180×120.

For example, after executing the operation S20, as illustrated in FIG. 4, the gesture detection method further comprises:

Operation S22: performing a gesture detection within the second gesture detection region.

For example, the operation S22 may comprise scanning the second gesture detection region by a gesture detector respectively using a second group of scales within a second scale range, so as to realize the gesture detection.

For example, the second scale range is smaller than the first scale range. The second scale range is relevant to the type of the gesture. For example, in an example, the gesture is a fist, and the second scale range may be 40×40 to 60×60. The second group of scales may comprise multiple scales with different values. The second group of scales may exemplarily comprise 40×40, 50×50, 55×55, 60×60 and the like. The number and specific values of the second group of scales may be set according to practical cases, which is not limited by the present disclosure. It should be noted that in case where multiple types of gestures need to be detected, the number and specific values of the second group of scales within the second scale range may be increased accordingly.

When a distance between one's hand and the image capture terminal is different, the gesture range is different. When the distance between the hand and the image capture terminal is relatively long, e.g. 2 meters, the gesture range is relatively small; when the distance between the hand and the image capture terminal is relatively close, e.g. 0.5 meters, the gesture range is relatively large. In order to ensure the gesture detector to detect out the gesture, no matter whether the distance between the hand and the image capture terminal is relatively long or close, parameters need to be set to allow the gesture detector to scan the gesture detection region for many times using different scales during performing the gesture detection with the gesture detector, so as to ensure detection of different types of gestures. If the gesture detector adopts all the scales within the first scale range (e.g. 40×40 to 150×150) to scan the gesture detection region, scanning time is relatively long. However, during the continuous gesture tracking detection period, after performing the shrinking process on the gesture detection region of each frame of original image, a plurality of scales within the second scale range (e.g. 40×40 to 60×60) may be adopted to perform the gesture detection within the preset detection region, so as to save computation time and improve response speed.

For example, as illustrated in FIG. 4, the operation S22 further comprises determining whether a second gesture exists within the second gesture detection region. In a case where the second gesture does not exist within the second gesture detection region after performing the gesture detection within the second gesture detection region, it is determined that the gesture detection is lost within the second frame of original image, and then a motion detection is performed on a third frame of original image. For example, in an example, in a case where the second gesture is determined not to exist within the second gesture detection region, the gesture detection method further comprises: performing a shrinking process and a background modeling on the third frame of original image to generate a third frame of background image, determining a motion region of the third frame of background image based on the third frame of background image, determining a third gesture detection region in the third frame of original image according to the motion region of the third frame of background image, and performing a gesture detection within the third gesture detection region.

It should be noted that detailed descriptions about performing the background modeling on the third frame of original image may refer to descriptions about performing the background modeling on the first frame of original image and the same contents are not repeated here.

For example, in a case where the second gesture exists within the second gesture detection region, a continuous gesture tracking detection is performed on the third frame of original image. For example, in an example, in a case where the second gesture exists within the second gesture detection region, the gesture detection method further comprises:

Operation S24: in a case where the gesture detection is executed within the second gesture detection region and the second gesture is determined to exist within the second gesture detection region, determining a second gesture range of the second gesture in the second frame of original image; and Operation S26: determining a third gesture detection range of the third frame of original image according to the second gesture range.

A size and a position of a gesture in each frame of original image don't jump and change in a reasonable speed, that is, the gesture of the user remains in a gesture detection range of an adjacent previous frame of original image after one frame time, and only a position of the gesture changes, so the second gesture can be detected within the second gesture detection region and a size of the third gesture detection region is determined according to the second gesture range.

For example, as illustrated in FIG. 5B, a region 51 denotes the second gesture range and a region 60 denotes the second gesture detection region determined according to the first gesture range. The region 51 may be a bounding rectangle of the detected second gesture, the second gesture detection region 60 may be in a rectangular shape, which is however not limited to the present disclosure. According to practical needs, the second gesture range 51 may be also a circle, an oval, a polygon and the like, as long as the second gesture range can cover the second gesture. Accordingly, the second gesture detection region 60 may be also a circle, an oval, a polygon and the like.

For example, the second gesture may be a fist, a stretch of a palm, a scissor hand, a stretch of an index finger and the like.

It should be noted that detailed descriptions about the second gesture and the second gesture range may refer to the descriptions about the first gesture and the first gesture range, detailed descriptions about the second frame of original image may refer to the descriptions about the first frame of original image, and the same contents are not repeated.

For example, the operation S26 may comprises following operations:

Operation S261: determining a center coordinate of the third gesture detection region of the third frame of original image according to a center coordinate of the second gesture range, and Operation S262: determining a size of the third gesture detection region of the third frame of original image according to a size of the second gesture range.

For example, during the operation S261, the center coordinate of the third gesture detection region of the third frame of original image is the center coordinate of the second gesture range, so as to ensure that the second gesture range is fully covered by the third gesture detection region. For example, as illustrated in FIG. 5B, the region 61 denotes the third gesture detection region determined according to the second gesture range. The second gesture range 51 is located in the center of the third gesture detection region 61.

For example, as illustrated in FIG. 5B, the second gesture range 51 may be a rectangle, and the third gesture detection region 61 may also be a rectangle, which is however not limited to the present disclosure. The third gesture detection region 61 may also be a circle, an oval, a polygon and the like, For example, during the operation S262, the size of the third gesture detection region of the third frame of original image may be expressed as $W_2 \times H_2$, $W_2$ is Y2 (e.g. 3) times of a maximum side length of the second gesture range, $H_2$ is X2 (e.g. 2) times of the maximum side length of the second gesture range, and X2 and Y2 are both integers greater than zero. For example, $H_2$ denotes a height of the third gesture detection region, and $W_2$ denotes a width of the third gesture detection region. It should be noted that the above descriptions about X2 and Y2 are only illustrative instead of being limitative. According to practical demands, X2 and Y2 may also be other values; for example, X2 may be 3 and Y2 may be 4. The specific vales of X2 and Y2 are not limited by the embodiments of the present disclosure.

For example, X1 and X2 may be identical, and Y1 and Y2 may be identical, which is however not limited. X1 and X2 may be different, and Y1 and Y2 may be different.

It should be noted, in the above descriptions of the present disclosure, only the first fame, the second frame and the third frame are taken for example to illustrate, which is however not limited. Gesture detections on each frame of image such as the fourth frame, the fifth frame may refer to the relevant descriptions about the first fame, the second frame and the third frame. Each frame of image comprises an original image, an original background image and a background image. For example, the first frame comprises a first frame of original image, a first frame of original background image and a first frame of background image.

For example, in the present disclosure, the gesture in each frame of original image is identical, i.e. the first gesture and the second gesture are identical and both are fists in a same shape, which is however not limited. The gesture in each frame of original image may be different; for example, in a case where the gesture motion changes from a scissor hand state of a hand to a fist state of the hand, the gesture in each frame of original image is different.

Figure 7:
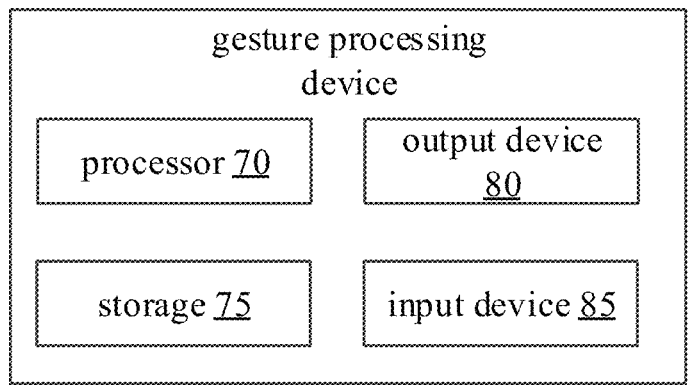
FIG. 7 is a schematic block diagram of a gesture processing device provided by an embodiment of the present disclosure.

FIG. 7 is a schematic block diagram of a gesture processing device provided by an embodiment of the present disclosure.

For example, as illustrated in FIG. 7, the gesture processing device provided by the embodiment of the present disclosure may comprise a processor 70 and a storage 75. It should be noted the components of the gesture processing device as illustrated in FIG. 7 are only illustrative instead of being limitative, and the gesture processing device may comprise other components according to practical needs.

For example, the processor 70 and the storage 75 may be communicated by network connection. The network may comprise a wireless network, a cable network, and/or any combinations of a wireless network and a cable network. The network may comprise a local area network, an internet, a telecommunication network, Internet of Things based on an internet and/or a telecommunication network, and/or any combinations of the above networks. The cable network may exemplarily adopt manners such a twisted pair cable, a coaxial cable, or an optical fiber transmission to communicate. The wireless network may exemplarily adopt communication manners such as a 3G/4G/5G mobile communication network, a Bluetooth, Zigbee or WIFI. A type and a function of the network are not limited by the present disclosure.

For example, the processor 70 and the storage 75 may be interconnected through a bus system (not shown) and/or other types of connection structures.

For example, the processor 70 may control other components in the gesture processing device to execute a desired function. The processor 70 may be a central processing unit (CPU) or other processing units with a data processing capability and/or program executing capability such as a graphics processing unit (GPU), a field programmable gate array (FPGA), a tensor processing unit (TPU) or the like. The CPU may be in a X86 or ARM architecture, or the like. The GPU may be integrated directly in a main board independently or built in a north bridge chip. The GPU may also be built in a CPU.

For example, the storage may comprise any combinations of one or more computer program products, and the computer program products may include computer-readable storage media in various forms, such as a volatile storage and/or a non-volatile storage. The volatile storage, for example, may include a random access memory (RAM) and/or a cache memory, etc. The non-volatile storage, for example, includes a read-only memory (ROM), a hard disk, an erasable programmable read-only memory (EPROM) and a portable compact disk read-only memory (CD-ROM), a USB storage, and a flash memory, etc. One or more computer instructions may be stored in the storage 75, and the processor 70 may execute the program instructions to realize all kinds of functions. Various applications and data, such as the first group of scales, the second group of scales, the preset detection region and various data used and/or generated by application programs, etc., may also be stored in the computer-readable storage medium.

For example, as illustrated in FIG. 7, the gesture processing device may further comprise an output device 80. The output device 80 may be used to output all kinds of operation information (such as a result of the gesture operation) to the outside (such as the user). For example, the output device 80 may be one or more of a display, a projector, a loudspeaker and the like. The display may output all kinds of operation information in a form of image or word, and the loudspeaker may output all kinds of operation information in an audio form.

For example, as illustrated in FIG. 7, the gesture processing device may further comprise an input device 85. The input device 85 may be exemplarily be a camera of smartphone, a camera of a tablet computer, a camera of a personal computer, or even a web camera and the like. The input device 85 may be used to receive a gesture instruction from the outside (such as the user) so as to realize a gesture interaction.

For example, following operations are realized when the computer instruction is executed by the processor 70: performing a shrinking process and a background modeling on a first frame of original image, to generate a first frame of background image, determining a motion region of the first frame of background image based on the first frame of background image, determining a first gesture detection region in the first frame of original image according to the motion region of the first frame of background image, and performing a gesture detection within the first gesture detection region.

For example, in an example, the operation "performing a shrinking process and a background modeling on a first frame of original image, to generate a first frame of background image" which is realized while the computer instruction is executed by the processor 70 comprises: performing the shrinking process on the first frame of original image and a first frame of original background image, to obtain a first frame of shrunken original image and a first frame of shrunken original background image, performing the background modeling on the first frame of shrunken original image based on the first frame of shrunken original background image, to obtain the first frame of background image.

For example, the first frame of background image comprises a motion detection region and a background region, the motion detection region denotes a different region between the first frame of original image and the first frame of original background image, the motion detection region comprises the motion region, and the background region denotes an identical region between the first frame of original image and the first frame of original background image.

For example, in an example, the operation "determining a motion region of the first frame of background image based on the first frame of background image" which is realized while the computer instruction is executed by the processor 70 comprises: determining an outline region of a moving object based on the first frame of background image; determining whether the outline region is greater than a threshold value of the motion region, if the outline region is greater than the threshold value of the motion region, determining the outline region to be the motion region of the first frame of background image.

For example, in an example, the operation "determining a first gesture detection region in the first frame of original image according to the motion region of the first frame of background image" which is realized while the computer instruction is executed by the processor 70 comprises: determining a center coordinate of the motion region of the first frame of background image; mapping the center coordinate of the motion region of the first frame of background image to the first frame of original image, to determine a center coordinate of a first gesture detection region in the first frame of original image; and extracting a region with a predetermined size in the first frame of original image as the first gesture detection region according to the center coordinate of the first gesture detection region.

For example, in an example, in a case where a first gesture is determined not to exist within the first gesture detection region after performing the gesture detection within the first gesture detection region, following operations may be further realized when the computer instruction is executed by the processor 70: performing a shrinking process and a background modeling on a second frame of original image, to generate a second frame of background image, determining a motion region of the second frame of background image based on the second frame of background image, determining a second gesture detection region in the second frame of original image according to the motion region of the second frame of background image, and performing a gesture detection within the second gesture detection region.

For example, in another example, in a case where a first gesture is determined to exist within the first gesture detection region after performing the gesture detection within the first gesture detection region, following operations may be further realized when the computer instruction is executed by the processor 70: determining a first gesture range of the first gesture in the first frame of original image, and determining a second gesture detection region of a second frame of original image according to the first gesture range of the first frame of original image.

For example, in an example, the operation "determining a second gesture detection region of a second frame of original image according to the first gesture range of the first frame of original image" which is realized while the computer instruction is executed by the processor 70 comprises: determining a center coordinate of the second gesture detection region of the second frame of original image according to a center coordinate of the first gesture range, and determining a size of the second gesture detection region of the second frame of original image according to a size of the first gesture range.

For example, the size of the second gesture detection region of the second frame of original image may be expressed as $W_1 \times H_1$, $W_1$ is Y1 (e.g. 3) times of the maximum side length of the first gesture range, $H_1$ is X1 (e.g. 2) times of the maximum side length of the first gesture range, and X1 and Y1 are both integers greater than zero.

For example, in an example, following operations are further realized when the computer instruction is executed by the processor 70: determining whether the size of the second gesture detection region of the second frame of original image is greater than a size of a preset detection region; under a condition that the size of the second gesture detection region of the second frame of original image is greater than the size of the preset detection region, performing a shrinking process on the second gesture detection region of the second frame of original image, to enable the size of the second gesture detection region of the second frame of original image to be identical to the size of the preset detection region; under a condition that the size of the second gesture detection region of the second frame of original image is not greater than the size of the preset detection region, keeping the size of the second gesture detection region of the second frame of original image unchanged.

For example, the size of the first gesture detection region of the first frame of original frame is greater than the size of the preset detection region.

For example, in an example, following operations are further realized when the computer instruction is executed by the processor 70: performing a gesture detection within the second gesture detection region.

In an example, in an example, in a case where a second gesture is determined to exist within the second gesture detection region after performing the gesture detection within the second gesture detection region, following operations may be further realized when the computer instruction is executed by the processor 70: determining a second gesture range of the second gesture in the second frame of original image, and determining a third gesture detection region of a third frame of original image according to the second gesture range.

For example, in an example, the operation "determining a third gesture detection region of a third frame of original image according to the second gesture range" which is realized while the computer instruction is executed by the processor 70 comprises: determining a center coordinate of the third gesture detection region of the third frame of original image according to a center coordinate of the second gesture range, and determining a size of the third gesture detection region of the third frame of original image according to a size of the second gesture range.

For example, the size of the third gesture detection region of the third frame of original image may be $W_2 \times H_2$, $W_2$ is Y2 (e.g. 3) times of the maximum side length of a second gesture range, $H_2$ is X2 (e.g. 2) times of the maximum side length of the second gesture range, and X2 and Y2 are both integers greater than zero.

For example, in another example, in a case where a second gesture is determined not to exist within the second gesture detection region after performing the gesture detection within the second gesture detection region, following operations are further realized when the computer instruction is executed by the processor 70: performing a shrinking process and a background modeling on a third frame of original image, to generate a third frame of background image, determining a motion region of the third frame of background image based on the third frame of background image, determining a third gesture detection region in the third frame of original image according to the motion region of the third frame of background image, and performing a gesture detection within the third gesture detection region.

It should be noted that detailed descriptions about the first gesture, the second gesture and the first gesture range, the second gesture range, the size of the first gesture detection region, the size of the second gesture detection region, the size of the preset detection region and the like may refer to relevant descriptions in the embodiments of the gesture detection method, and the same contents are not repeated.

An embodiment of the present disclosure also provides a computer-readable storage medium; for example, one or more non-transitory computer-readable instructions may be stored in the computer-readable storage medium. For example, in a case where the non-transitory computer-readable instruction is executed by a computer, one or more steps of the above gesture detection method may be executed.

For example, the computer-readable storage medium may be applied in the above gesture processing device. For example, the computer-readable storage medium may be the storage in the gesture processing device. It should be noted that descriptions about the computer-readable storage medium may refer to the descriptions about the storage in the above embodiments of the gesture processing device, and overlapping contents are not repeated.

The following statements should be noted:

(1) The accompanying drawings involve only the structure(s) in connection with the embodiment(s) of the present disclosure, and other structure(s) can be referred to common design(s); and (2) In case of no conflict, features in one embodiment or in different embodiments can be combined to obtain new embodiments.

What are described above is related to the illustrative embodiments of the disclosure only and not limitative to the scope of the disclosure; the scopes of the disclosure are defined by the accompanying claims.

What is claimed is:

1. A gesture detection method, comprising:
   performing a shrinking process and a background modeling on a first frame of original image, to generate a first frame of background image,
   determining a motion region of the first frame of background image based on the first frame of background image,
   determining a first gesture detection region in the first frame of original image according to the motion region of the first frame of background image, and
   performing a gesture detection within the first gesture detection region;
   in a case where a first gesture is determined to exist within the first gesture detection region after performing the gesture detection within the first gesture detection region,
   determining a first gesture range of the first gesture in the first frame of original image, and
   determining a second gesture detection region of a second frame of original image according to the first gesture range of the first frame of original image, comprising:
      determining a center coordinate of the second gesture detection region of the second frame of original image according to a center coordinate of the first gesture range, and
      determining a size of the second gesture detection region of the second frame of original image according to a size of the first gesture range, wherein the size of the second gesture detection region of the second frame of original image is $W_1 \times H_1$, $H_1$ is X1 times of a maximum side length of the first gesture range, $W_1$ is Y1 times of the maximum side length of the first gesture range, and X1 and Y1 are both integers greater than zero; and
   determining whether the size of the second gesture detection region of the second frame of original image is greater than a size of a preset detection region,
   under a condition that the size of the second gesture detection region of the second frame of original image is greater than the size of the preset detection region, performing a shrinking process on the second gesture detection region of the second frame of original image, to enable the size of the second gesture detection region of the second frame of original image to be identical to the size of the preset detection region;
   under a condition that the size of the second gesture detection region of the second frame of original image is not greater than the size of the preset detection region, keeping the size of the second gesture detection region of the second frame of original image unchanged.

2. The gesture detection method according to claim 1, wherein a size of the first gesture detection region of the first frame of original image is greater than the size of the preset detection region.

3. The gesture detection method according to claim 1, further comprising:
   performing a gesture detection within the second gesture detection region.

4. The gesture detection method according to claim 3, further comprising:
   in a case where a second gesture is determined to exist within the second gesture detection region after performing the gesture detection within the second gesture detection region, determining a second gesture range of the second gesture in the second frame of original image, and
   determining a third gesture detection region of a third frame of original image according to the second gesture range.

5. The gesture detection method according to claim 4, wherein the determining the third gesture detection region of the third frame of original image according to the second gesture range comprises:
   determining a center coordinate of the third gesture detection region of the third frame of original image according to the center coordinate of the second gesture range, and
   determining a size of the third gesture detection region of the third frame of original image according to a size of the second gesture range,
   wherein the size of the third gesture detection region of the third frame of original image is $W_2 \times H_2$, $H_2$ is X2 times of a maximum side length of the second gesture range, $W_2$ is Y2 times of the maximum side length of the second gesture range, and X2 and Y2 are both integers greater than zero.

6. The gesture detection method according to claim 1, wherein the determining the motion region of the first frame of background image based on the first frame of background image comprises:
   determining an outline region of a moving object based on the first frame of background image;
   determining whether the outline region is greater than a threshold value of the motion region, if the outline region is greater than the threshold value of the motion region, determining the outline region to be the motion region of the first frame of background image.

7. The gesture detection method according to claim 1, wherein the performing the shrinking process and the background modeling on the first frame of original image, to generate the first frame of background image comprises:
   performing the shrinking process on the first frame of original image and a first frame of original background image, to obtain a first frame of shrunken original image and a first frame of shrunken original background image,
   performing the background modeling on the first frame of shrunken original image based on the first frame of shrunken original background image, to obtain the first frame of background image,
   wherein the first frame of background image comprises a motion detection region and a background region, the motion detection region denotes a different region between the first frame of original image and the first frame of original background image, the motion detection region comprises the motion region, and the background region denotes an identical region between the first frame of original image and the first frame of original background image.

8. A computer-readable medium, configured to store a computer-readable instruction non-transitorily, wherein
   in a case where the computer-readable instruction is executed by a computer, the gesture detection method according to claim 1 is executed.

9. A gesture detection method, comprising:
   performing a shrinking process and a background modeling on a first frame of original image, to generate a first frame of background image, determining a motion region of the first frame of background image based on the first frame of background image,
determining a first gesture detection region in the first frame of original image according to the motion region of the first frame of background image,
performing a gesture detection within the first gesture detection region;
in a case where a first gesture is determined to exist within the first gesture detection region after performing the gesture detection within the first gesture detection region,
determining a first gesture range of the first gesture in the first frame of original image, and
determining a second gesture detection region of a second frame of original image according to the first gesture range of the first frame of original image,
performing a gesture detection within the second gesture detection region,
in a case where a second gesture is determined not to exist within the second gesture detection region after performing the gesture detection within the second gesture detection region,
performing a shrinking process and a background modeling on a third frame of original image, to generate a third frame of background image,
determining a motion region of the third frame of background image based on the third frame of background image,
determining a third gesture detection region in the third frame of original image according to the motion region of the third frame of background image, and
performing a gesture detection within the third gesture detection region.

10. A gesture processing device, comprising a processor and a memory, wherein the memory is configured to store a computer instruction, and following operations are realized when the computer instruction is executed by the processor:
performing a shrinking process and a background modeling on a first frame of original image, to generate a first frame of background image,
determining a motion region of the first frame of background image based on the first frame of background image,
determining a first gesture detection region in the first frame of original image according to the motion region of the first frame of background image, and
performing a gesture detection within the first gesture detection region;
in a case where a first gesture is determined to exist within the first gesture detection region after performing the gesture detection within the first gesture detection region,
determining a first gesture range of the first gesture in the first frame of original image, and
determining a second gesture detection region of a second frame of original image according to the first gesture range of the first frame of original image, comprising:
determining a center coordinate of the second gesture detection region of the second frame of original image according to a center coordinate of the first gesture range, and
determining a size of the second gesture detection region of the second frame of original image according to a size of the first gesture range, wherein the size of the second gesture detection region of the second frame of original image is $W_1 \times H_1$, $H_1$ is X1 times of a maximum side length of the first gesture range, $W_1$ is Y1 times of the maximum side length of the first gesture range, and X1 and Y1 are both integers greater than zero;
determining whether the size of the second gesture detection region of the second frame of original image is greater than a size of a preset detection region,
under a condition that the size of the second gesture detection region of the second frame of original image is greater than the size of the preset detection region, performing a shrinking process on the second gesture detection region of the second frame of original image, to enable the size of the second gesture detection region of the second frame of original image to be identical to the size of the preset detection region;
under a condition that the size of the second gesture detection region of the second frame of original image is not greater than the size of the preset detection region, keeping the size of the second gesture detection region of the second frame of original image unchanged;
a size of the first gesture detection region of the first frame of original image is greater than the size of the preset detection region.

11. The gesture processing device according to claim 10, wherein when the computer instruction is executed by the processor to realize determining the motion region of the first frame of background image based on the first frame of background image, following operations are further realized:
determining an outline region of a moving object based on the first frame of background image;
determining whether the outline region is greater than a threshold value of the motion region, if the outline region is greater than the threshold value of the motion region, determining the outline region to be the motion region of the first frame of background image.

12. The gesture processing device according to claim 10, wherein
when the computer instruction is executed by the processor to realize performing the shrinking process and the background modeling on the first frame of original image, to generate the first frame of background image, following operations are further realized:
performing the shrinking process on the first frame of original image and a first frame of original background image, to obtain a first frame of shrunken original image and a first frame of shrunken original background image,
performing the background modeling on the first frame of shrunken original image based on the first frame of shrunken original background image, to obtain the first frame of background image,
wherein the first frame of background image comprises a motion detection region and a background region, the motion detection region denotes a different region between the first frame of original image and the first frame of original background image, the motion detection region comprises the motion region, and the background region denotes an identical region between the first frame of original image and the first frame of original background image.

* * * * *